(12) United States Patent
Kruger et al.

(10) Patent No.: US 9,546,727 B2
(45) Date of Patent: Jan. 17, 2017

(54) CARRIER OIL FEED CHANNEL LUBRICATING SYSTEM

(71) Applicant: Dana Automotive Systems Group, LLC, Maumee, OH (US)

(72) Inventors: Caleb S. Kruger, Delta, OH (US); Scott L. Steward, Jr., Malinta, OH (US); Daniel D. Carmean, Swanton, OH (US); Edwin O. Swinehart, Jr., Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 115 days.

(21) Appl. No.: 14/606,229

(22) Filed: Jan. 27, 2015

(65) Prior Publication Data

US 2015/0219204 A1 Aug. 6, 2015

Related U.S. Application Data

(60) Provisional application No. 61/933,916, filed on Jan. 31, 2014.

(51) Int. Cl.
*F16H 57/04* (2010.01)

(52) U.S. Cl.
CPC ...... *F16H 57/0409* (2013.01); *F16H 57/0424* (2013.01); *F16H 57/0457* (2013.01); *F16H 57/0483* (2013.01)

(58) Field of Classification Search
CPC .............. F16H 57/0409; F16H 57/0424; F16H 57/0457; F16H 57/0483

USPC ........................................................ 184/6.12
See application file for complete search history.

(56) References Cited

U.S. PATENT DOCUMENTS

| | | | |
|---|---|---|---|
| 1,631,217 A * | 6/1927 | Matthews | B60R 17/00 184/13.1 |
| 3,318,173 A | 5/1967 | Puidokas | |
| 4,175,643 A | 11/1979 | Jenkins | |
| 4,612,818 A | 9/1986 | Hori et al. | |
| 5,316,106 A * | 5/1994 | Baedke | B60K 17/16 184/104.3 |
| 5,453,181 A * | 9/1995 | Dahlback | F16H 57/0415 184/11.1 |
| 6,244,386 B1 | 6/2001 | Takasaki et al. | |
| 6,398,687 B2 | 6/2002 | Iwata | |
| 7,374,507 B2 | 5/2008 | Corless et al. | |
| 7,892,131 B2 * | 2/2011 | Hilker | F16H 57/0483 475/160 |
| 7,963,875 B2 | 6/2011 | Hilker et al. | |
| 8,167,758 B2 | 5/2012 | Downs et al. | |
| 8,382,628 B2 * | 2/2013 | Hilker | F16H 57/0483 475/160 |
| 8,409,044 B2 | 4/2013 | Hilker et al. | |
| 8,512,193 B1 | 8/2013 | Hilker et al. | |
| 8,657,073 B2 | 2/2014 | Matsumoto et al. | |
| 2005/0185873 A1 | 8/2005 | Musso | |
| 2008/0096715 A1 | 4/2008 | Ono | |

(Continued)

*Primary Examiner* — Michael Riegelman
(74) *Attorney, Agent, or Firm* — Marshall & Melhorn, LLC

(57) ABSTRACT

An oil feed channel lubricating system including a first upstanding wall, a floor and a portion of an interior wall of a carrier. The channel has a first portion angled at a first angle and a second portion angled at a second angle. The first portion preferably has a shallower angle than the second portion. A gap is located between a top of the first upstanding wall and the interior wall of the carrier.

11 Claims, 6 Drawing Sheets

(56) References Cited

U.S. PATENT DOCUMENTS

| | | | |
|---|---|---|---|
| 2009/0023531 A1* | 1/2009 | Hilker | F16H 57/0483 |
| | | | 475/160 |
| 2010/0304914 A1 | 12/2010 | Barrett | |
| 2011/0212805 A1* | 9/2011 | Hilker | F16H 57/0483 |
| | | | 475/160 |
| 2012/0172167 A1 | 7/2012 | Myers | |
| 2015/0276043 A1* | 10/2015 | Girardot | F16H 57/0423 |
| | | | 475/160 |
| 2016/0153546 A1* | 6/2016 | Ogawa | F16H 57/0476 |
| | | | 475/152 |

* cited by examiner

CARRIER OIL FEED CHANNEL LUBRICATING SYSTEM

CROSS-REFERENCE TO RELATED APPLICATIONS

This application claims the benefit of U.S. Provisional Application No. 61/933,916 filed on Jan. 31, 2014, which is incorporated by reference in its entirety herein.

FIELD OF THE INVENTION

An oil feed channel lubricating system for a vehicle is described. More particularly, the device and the use of an oil feed channel lubricating system in a differential carrier for a drive axle is described.

BACKGROUND OF THE INVENTION

Providing adequate lubrication to the components of an interaxle differential is important to the operation and longevity of the automotive drive axle system. For example, it is important to properly lubricate the various gears and pinions of the axle assembly including their teeth and the bearing surfaces on which they are supported for rotation. Typical lubricating systems for interaxle differentials provide a gear driven pump for positive supply of lubricating oil to various elements within the interaxle differential. However, it is not uncommon to use splash lubrication, although not as reliable as pump lubrication, it is less expensive. In splash lubrication, lubricant clings to the rotating component as it passes through the lubricant in the sump and is thereafter slung outwardly from the rotating component due to centrifugal force. Splash lubrication does not generally insure that lubricating oil will be accurately or sufficiently supplied to the various elements requiring lubrication. Splash lubrication is also disadvantageous because system components that churn the lubricant and cause it to splash are exposed to drag forces. The drag forces reduce efficiency of the system.

It would be desirable for a drive axle system to maintain operating efficiency, while also ensuring all the differential components are adequately lubricated for performance and longevity.

SUMMARY

An oil feed channel lubricating system including a first upstanding wall, a floor and a portion of an interior wall of a carrier. The channel has a first portion angled at a first angle and a second portion angled at a second angle. The first portion preferably has a shallower angle than the second portion. A gap is located between a top of the first upstanding wall and the interior wall of the carrier.

DESCRIPTION OF PREFERRED EMBODIMENTS

Figure 1:
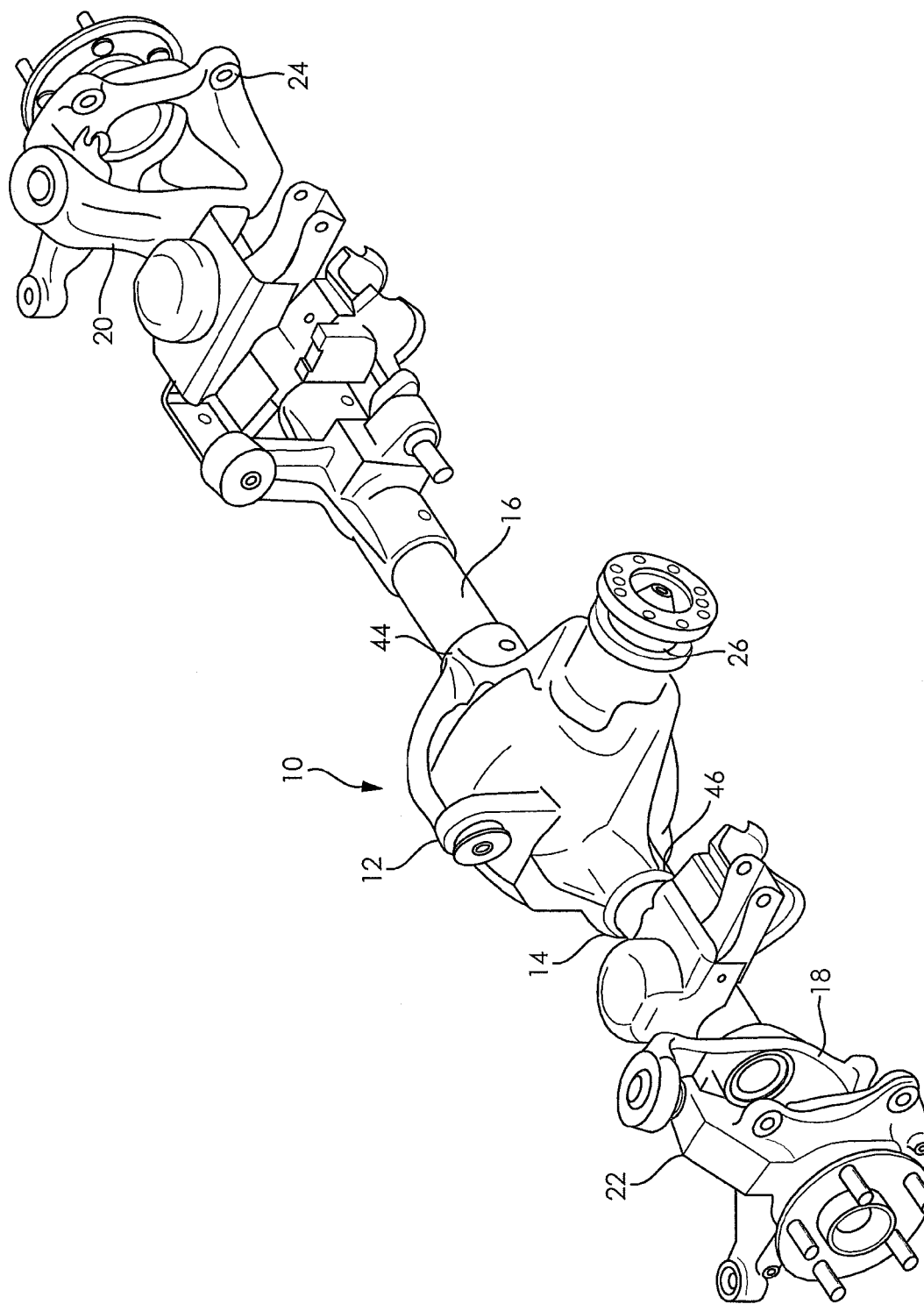
FIG. 1 is a schematic, perspective view of one embodiment of a steerable drive axle system.

It is to be understood that the invention may assume various alternative orientations and step sequences, except where expressly specified to the contrary. It is also to be understood that the specific assemblies, articles and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

FIG. 1 depicts one embodiment of a steerable drive axle system 10, such as for a driving axle for a vehicle. While the system 10 will be described, and is depicted in a driving axle for a vehicle, it can also be readily adapted for use in front independent axle configurations, or any system utilizing a housing with lubricant therein.

The system 10 comprises a carrier 12, first and second tube assemblies 14, 16, first and second tube yokes 18, 20 and first and second knuckles 22, 24 rotatably mounted to the tube yokes 18, 20. The system 10 may also comprise various brackets and mounts for securing suspension components, braking components or other vehicle components thereon.

Figure 2:
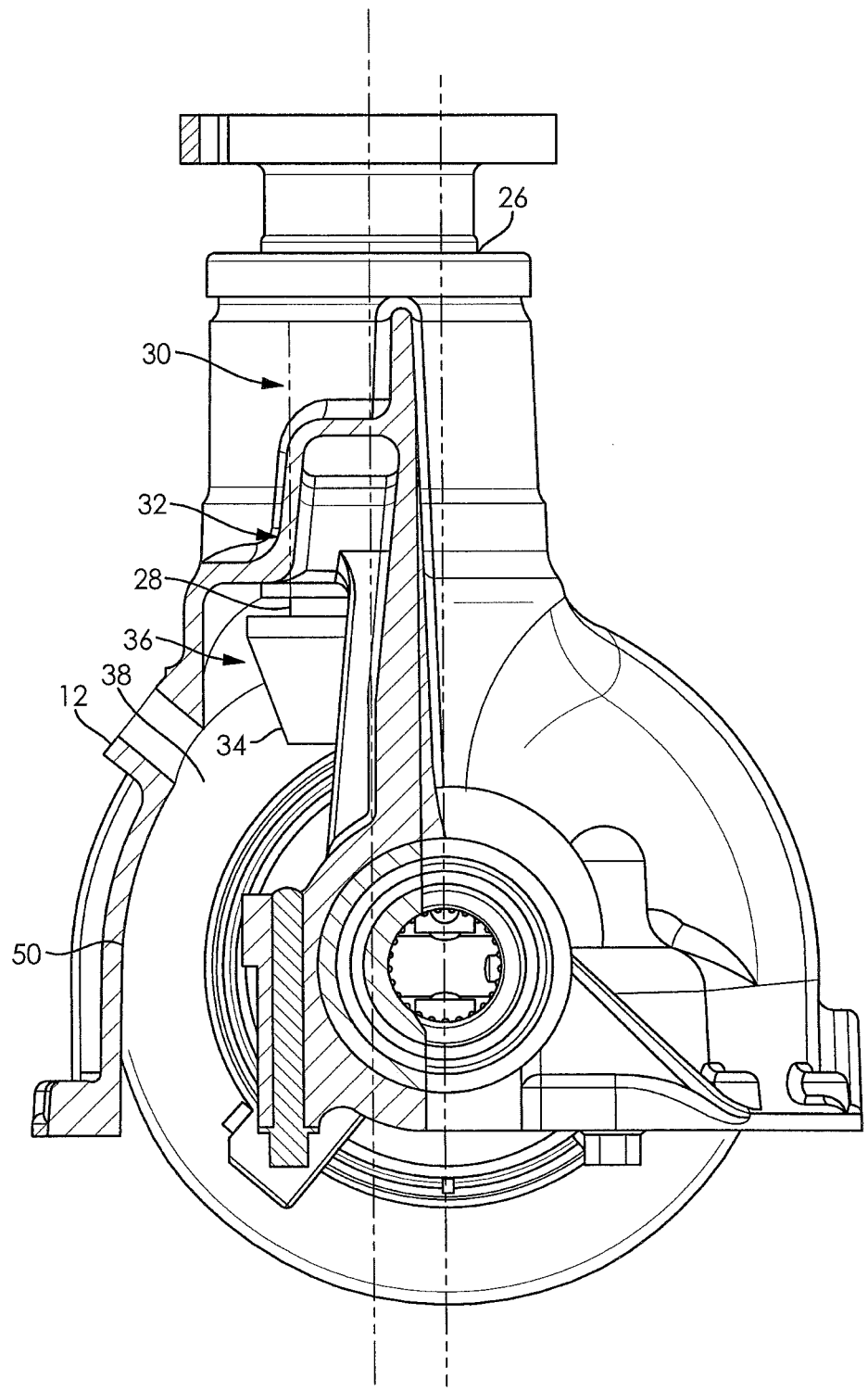
FIG. 2 is a schematic, partial cut away side view of one embodiment of a carrier of the system of FIG. 1.

The carrier 12 defines three openings. As seen in FIGS. 1 and 2, a first opening 26 receives a pinion shaft 28 therein. A first end 30 of the pinion shaft 28 is connected to a drive shaft (not shown) for rotation therewith. As can be appreciated from FIG. 2, a second, opposite end 32 of the pinion shaft 28 has a pinion gear 34 formed thereon. The pinion shaft 28 and pinion gear 34 are located within a hollow interior portion 36 of the carrier 12.

Pinion gear teeth (not shown) are meshed with ring gear teeth (not shown) on a ring gear 38. The pinion gear 34 and ring gear 38, except for their respective teeth, can be seen in FIGS. 2 and 3. The ring gear 38 is secured to a differential case 40, such as via mechanical fasteners 42, where the case 40 and the fasteners 42 can be appreciated in FIG. 3.

Housed within the case 40 is at least one differential pinion gear (not shown) and at least one differential side gear (not shown). Typically, two differential pinion gears and two differential side gears are located within the case 40. The pinion gears are meshed with the side gears in traditional fashion to permit respective differential rotation.

The side gears are connected to first and second axle half shafts (not shown). The axle half shafts extend through the first and second tube assemblies 14, 16, respectively. The first and second tube assemblies 14, 16 are located in second and third carrier openings 44, 46 respectively, as depicted in FIG. 1. The axle half shafts extend to the first and second knuckles 22, 24 where, through additional connections, they provide rotational drive to the wheels.

Figure 3:
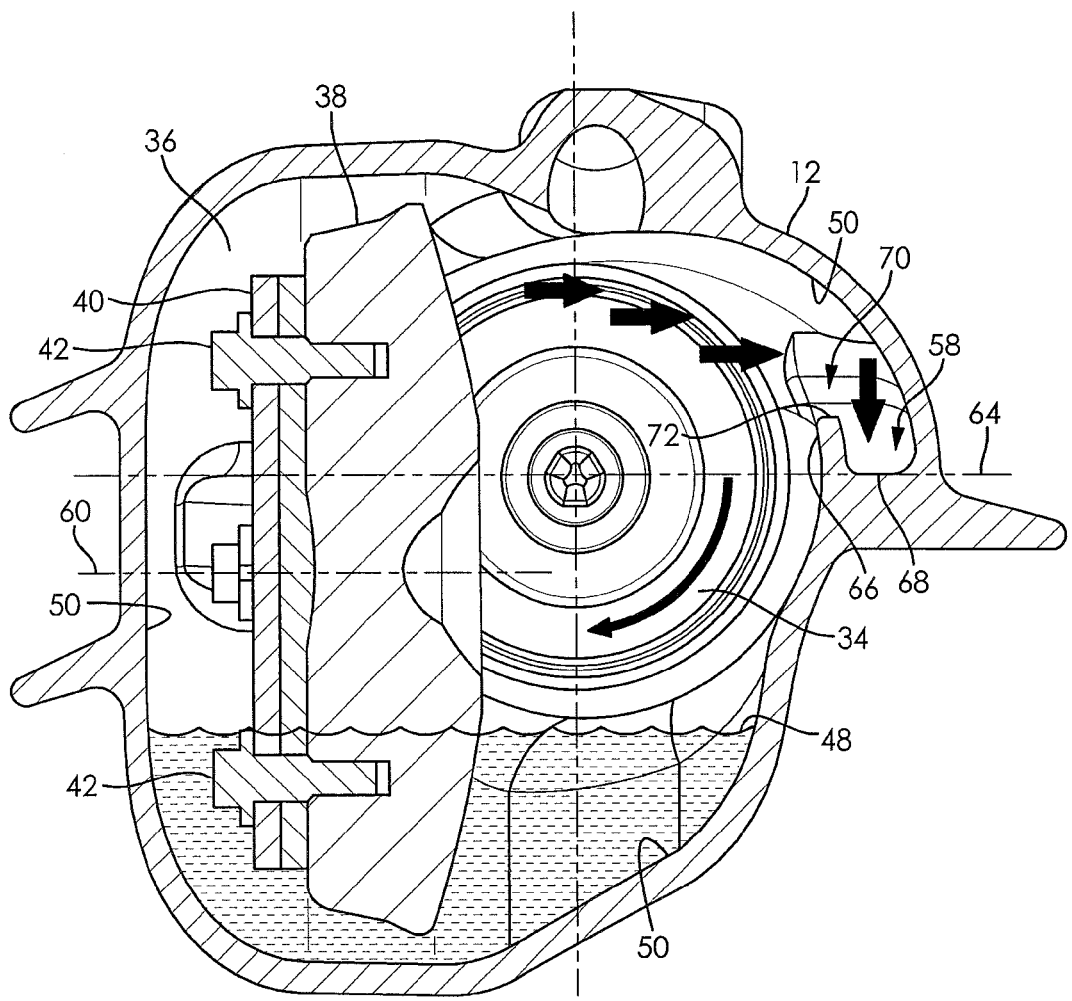
FIG. 3 is a schematic, partial cut away view of the carrier of FIG. 2 from a different angle.

As schematically depicted in FIG. 3, lubricant 48 is located within the carrier 12 to lubricate and cool the moving and meshed components described above. The same, or a different, lubricant may also be located within the tube assemblies 14, 16 to provide the same benefit for those components.

Within the carrier 12, a supply of lubricant 48 is typically moved by virtue of the rotating parts. The rotating parts throw the lubricant 48 throughout the carrier 12 and splash lubricate the various parts. For example, the ring gear 38 and differential case 40 are at least partially immersed in lubricant 48 within the carrier 12. As they rotate through the lubricant 48, they splash the lubricant 48 via centrifugal force, through the carrier 12 onto the parts located with the carrier 12 and onto interior walls 50 of the carrier 12, as shown by the arrows.

Figure 4:
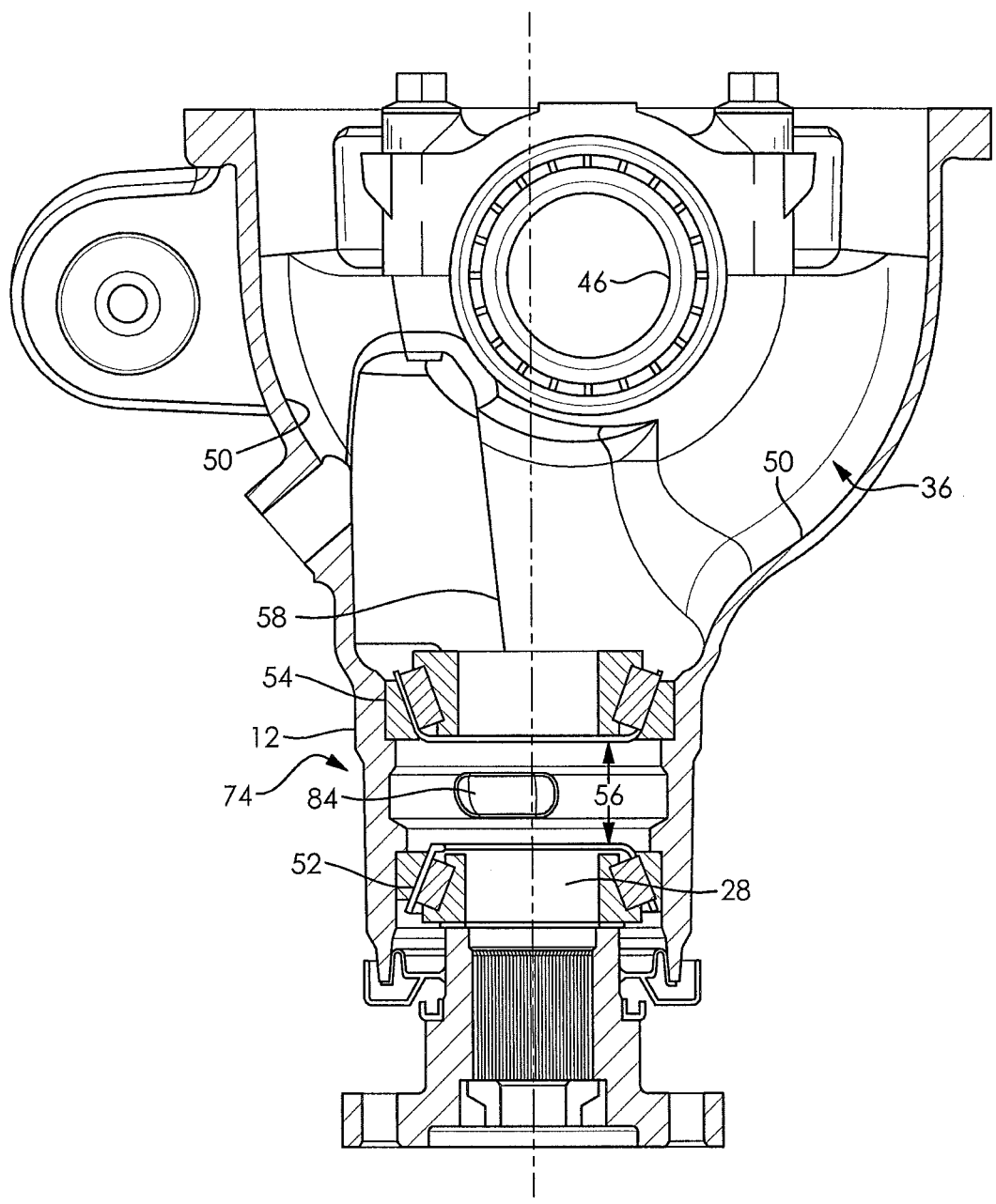
FIG. 4 is a schematic, partial cut away side view of the carrier of FIG. 2.

Turning now to FIG. 4, it can be appreciated that the pinion shaft 28 is supported within the carrier 12 by bearings. In the depicted embodiment, the pinion shaft 28 is supported by a first forward bearing 52 and a second rear bearing 54. A gap 56 separates the two bearings 52, 54.

It is preferred that these bearings 52, 54 receive adequate lubrication during all operating conditions of the vehicle. In order for the bearings 52, 54 to receive adequate lubrication, an oil feed channel 58 is defined on an interior wall 50 of the carrier 12. More particularly, the channel 58 may be integrally formed, such as by casting it, with the rest of the carrier 12 so that it is formed with the interior wall 50.

As can be appreciated from FIGS. 3 and 4 in this embodiment, the channel 58 is formed on the carrier interior wall 50 opposite the ring gear 38. The channel 58 as depicted is above a rotational axis 60 of the ring gear 38 and approximately coplanar with a rotational axis 64 of the pinion gear 34. It can be appreciated that the channel can also be located adjacent the ring gear 58 or in other locations within the carrier 12.

Figure 5:
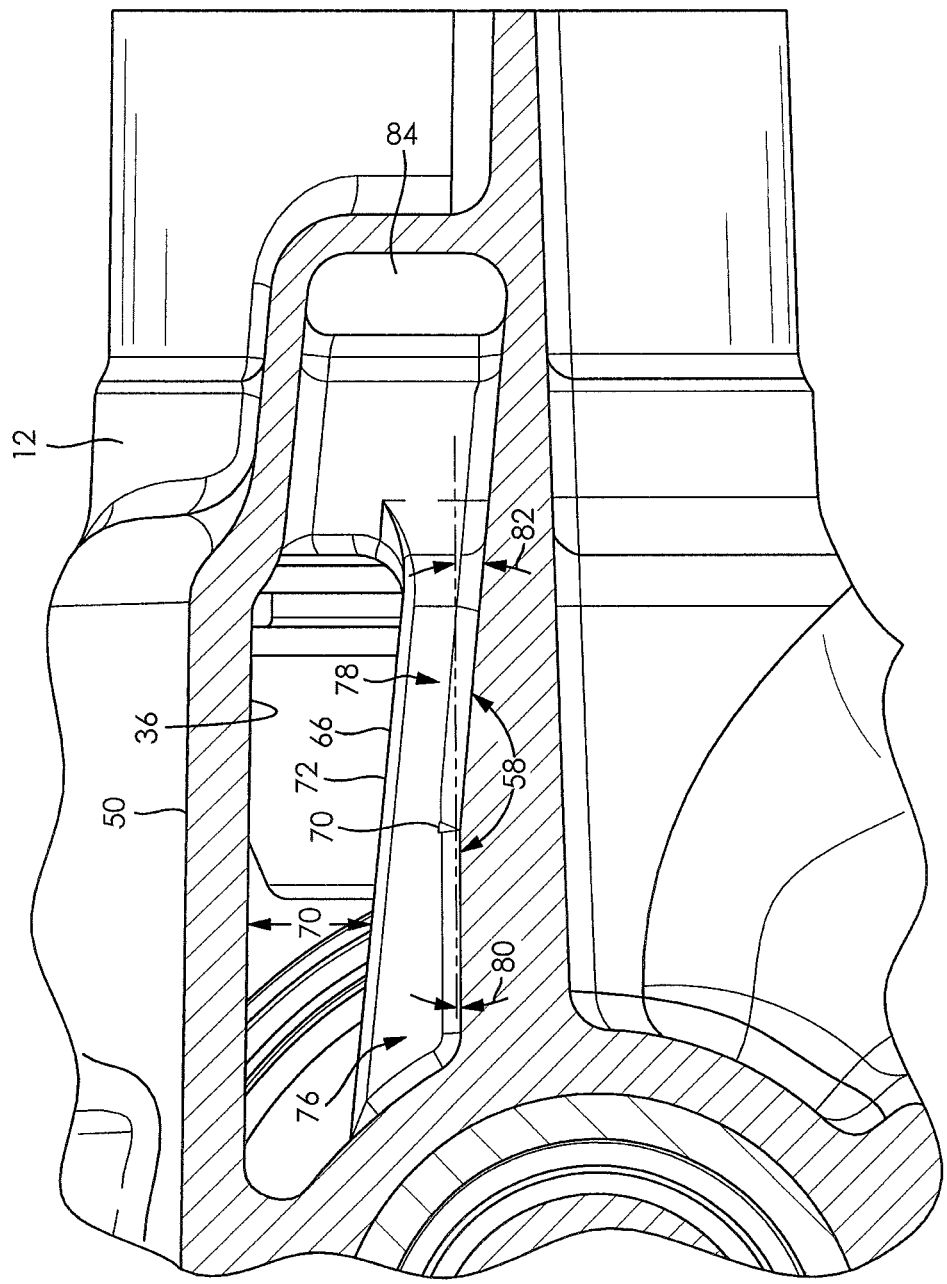
FIG. 5 is a schematic, partial cut away side view of one embodiment of a channel in the carrier.
Figure 6:
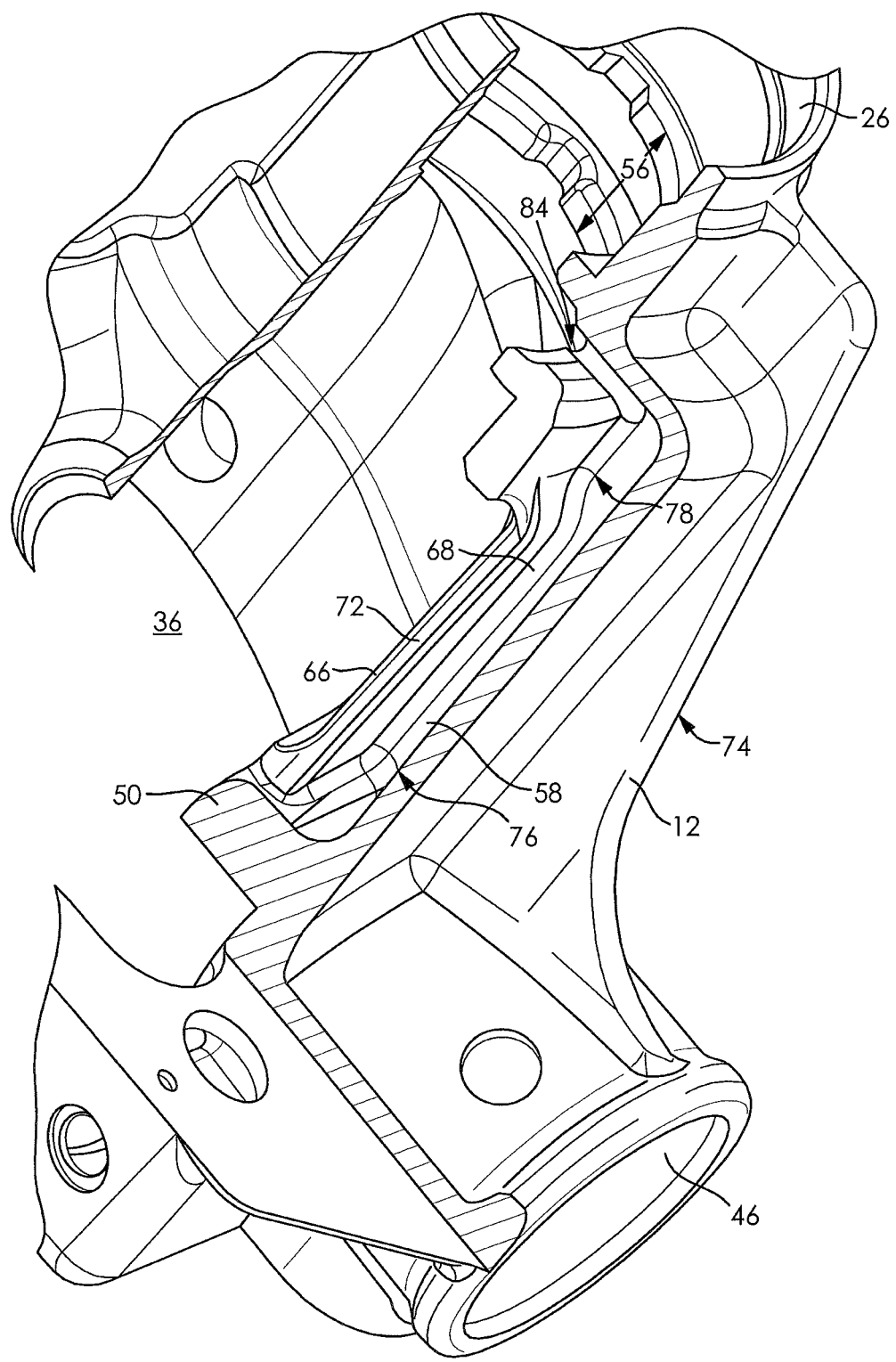
FIG. 6 is a schematic, partial cut away perspective view of the channel of FIG. 5 in the carrier.

The channel 58 is defined by a first upstanding wall 66, a channel floor 68 and a portion of the carrier wall 50, which can also be appreciated in FIGS. 5 and 6. The upstanding wall 66 extends a predetermined height. The wall 66 terminates at the predetermined height leaving a gap 70 between a top 72 of the wall 66 and the interior wall 50 of the hollow interior portion 36, of the carrier 12. The gap 70 may extend the length of the upstanding wall 66.

The length of the upstanding wall 66 in the depicted embodiment of FIG. 6 can be appreciated to be approximately the length of a front half 74 of the carrier 12. Namely, the length of the upstanding wall 66, and thus the channel 58, extends from approximately the opening 46 (or 44 if on the other side of the carrier 12) for the tube assembly 16 (14 for the other side of the carrier 12) extending forward to the pinion bearings 52, 54.

The gap 70 permits splashed lubricant 48 to splash over the wall 66 and into the channel 58. The channel 58 also receives lubricant 48 by virtue of the lubricant 48 running down the interior wall 50 of the carrier 12 and into the channel 58.

The channel 58 has a first portion 76 and a second portion 78. The first portion 76 is adjacent the axle housing opening 46, while the second portion 78 is adjacent the gap 56 that separates the pinion bearings 52, 54, which can be appreciated from FIG. 6.

As depicted in FIGS. 5 and 6, the first portion 76 of the channel 58 can be seen. The channel floor 68 of the first portion 76 is angled at a first angle 80, which may be between approximately negative 1 to 10 degrees from horizontal.

The first portion 76 transitions directly into the second portion 78 of the channel 58. The second portion 78 of the channel 58 is angled at a second angle 82, which may be between approximately negative 1 to 15 degrees from horizontal.

Preferably, the first portion 76 has a shallower angle than the second portion 78 so that it acts as a lubricant reservoir. In other words, the first portion 76 receives splash lubrication and it can retain at least a portion of the received lubricant 48 therein. The angle of the first portion 76 is also designed to be shallow enough that when a predetermined amount of lubricant 48 is received therein, that it allows the lubricant 48 to flow into the second portion 78.

The second portion 78 of the channel 58 has an outlet 84 located between the first and second pinion shaft bearings 52, 54, as seen in FIGS. 4 and 6. Lubricant 48 in the channel 58 is thus delivered between the two pinion shaft bearings 52, 54 to lubricate the bearings 52, 54.

It may be preferred to have the channel 58 function, at least partially, as a lubricant reservoir, capable of delivering lubricant 48 to the pinion shaft bearings 52, 54 under certain conditions. By way of one, non-limiting example of such a condition, it may be desirable to deliver lubricant 48 to the pinion bearings 52, 54 when the vehicle is being driven at a non-horizontal angle. In this instance, the lubricant 48 being splashed within the carrier 12 might not make it in adequate quantities, or consistently, to the bearings 52, 54. However, the splashed lubricant 48 will make it into the channel 58 where it can be consistently and adequately delivered to the bearings 52, 54.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

What is claimed is:

1. An oil feed channel lubricating system for a differential, comprising:
    a first upstanding wall; and
    a floor integrally formed with said first upstanding wall and a portion of an interior wall of a carrier, wherein said floor is perpendicular to said first upstanding wall and said interior wall of said carrier;
    wherein said floor comprises a first portion angled at a first angle and a second portion angled at a second angle, wherein said first portion has a different angle than said second portion; and
    a gap located between a top of said first upstanding wall and said interior wall of said carrier defining an open top channel, wherein said channel is parallel with said interior wall of said carrier and the length of said channel is equal to the length of said upstanding wall.

2. An oil feed channel lubricating system for a differential according to claim 1, wherein said channel is integrally formed on said interior wall of said carrier opposite a ring gear.

3. An oil feed channel lubricating system for a differential according to claim 1, wherein said channel is above a rotational axis of a ring gear and coplanar with a rotational axis of a pinion gear.

4. An oil feed channel lubricating system for a differential according to claim 1, wherein said length of said upstanding wall is equal to the distance from an output opening in said carrier to a pinion bearing.

5. An oil feed channel lubricating system for a differential according to claim 1, wherein said first portion of said channel is located adjacent an axle housing opening.

6. An oil feed channel lubricating system for a differential according to claim 1, wherein said second portion is located adjacent a pinion bearing.

7. An oil feed channel lubricating system for a differential according to claim 1, wherein said first angle of said first portion is between negative 1 to positive 10 degrees from horizontal with a rotational axis of a pinion gear.

8. An oil feed channel lubricating system for a differential according to claim 1, wherein said second angle of said second portion is between negative 1 to positive 15 degrees from horizontal with a rotation axis of a pinion gear.

9. An oil feed channel lubricating system for a differential according to claim 1, wherein said second portion comprises an outlet located between first and second pinion shaft bearings.

10. An oil feel channel lubricating system for a differential according to claim 1, wherein said gap has a constant width along said length of said channel.

11. An oil feel channel lubricating system for a differential according to claim 1, wherein an end of said gap extends past the gear head of a pinion gear.

* * * * *